UNITED STATES PATENT OFFICE.

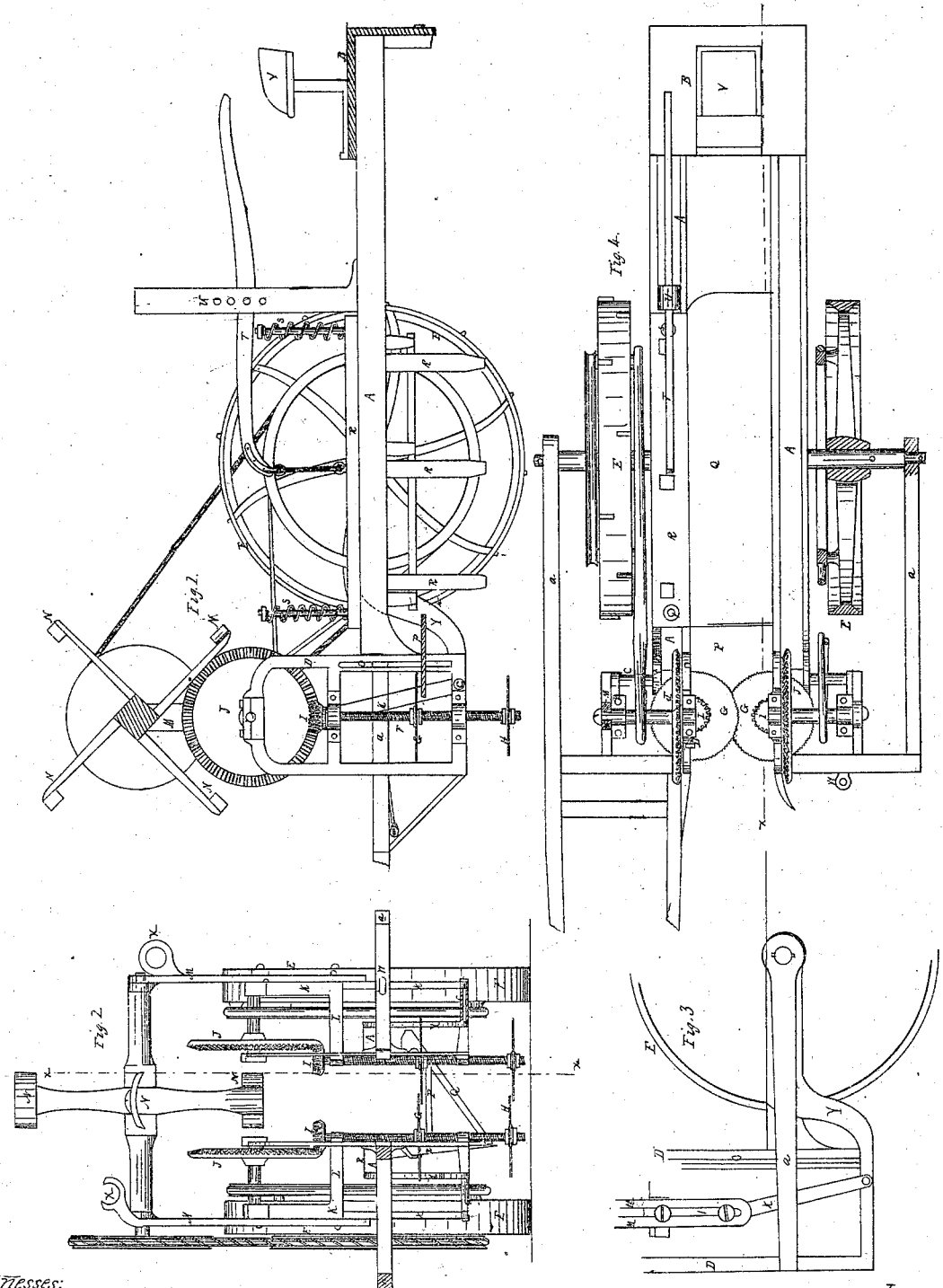

DANIEL J. TITTLE, OF ALBANY, NEW YORK.

IMPROVEMENT IN CORN-HARVESTERS.

Specification forming part of Letters Patent No. 58,320, dated September 25, 1866.

*To all whom it may concern:*

Be it known that I, DANIEL J. TITTLE, of Albany, in the county of Albany, in the State of New York, have invented new and useful Improvements in Corn and Cane Harvesters; and I do hereby declare the following to be a full, clear, and exact description of the same, reference being had to the accompanying drawings, in which—

Figure 1 is a vertical longitudinal section of the machine on line $x\ x$ of Fig. 2. Fig. 2 is a front elevation of my machine. Fig. 3 is a side elevation of the front part of my machine, showing the manner of adjusting the reel. Fig. 4 is a plan view of the whole machine, except the reel, which is not represented.

The nature of my invention consists, first, in cutting the stalks of corn by revolving cutters, which are adjustable in height, so as to cut the said stalks as near to or far from the ground as desired; second, in cutting the stalks at two points, once near the ground, so that the root may be plowed in without difficulty, and once at a distance from the ground sufficient to permit easy handling; third, in the general construction of the mechanical devices for accomplishing the purposes designed.

That others may understand the construction and operation of my machine, I will more particularly describe it.

The frame A is composed of two stout side bars, which are connected at the rear ends by the stout platform B, cast in metal in the form shown, and at their front ends by the bolt C, which may, if desired, be extended entirely across for that purpose. They are otherwise unconnected, because it is desired that the stalks as cut should fall between them, and when collected into a sufficient gavel be dropped upon the ground and into the furrow on one side of the row being cut.

At the front end of each side bar A is a vertical frame, D, which supports the cutting apparatus and the mechanism which operates them. This frame I construct as shown, though that particular form is not essential.

The two bearing and driving wheels E are mounted upon axles, which are secured to each side bar respectively. They are each provided with pulleys or gearing, by which the cutters are driven. The cutters on one side are thus made independent of the cutters on the other side, so that in turning the machine, though the movement of the cutter on one side may be arrested or reversed, still the cutting operation of the machine will not be sensibly affected. Attached to one of the drivers is another pulley for driving the reel.

Mounted in the frame D is the vertical shaft F, upon which are placed the cutters G and H. At the upper end of the shaft F is a bevel-gear, I, which meshes into a larger bevel-gear, J, and driven by pulley or other means from the bearing-wheel E. The bevel-driver J is mounted between the frame D and the frame K, Fig. 2, which latter frame also supports the reel. The frame K is connected to the frame D by the brace L, just below the bevel-wheel J, and it thence extends downward and backward, and at its lower end is secured by the bolt C.

The reel has its shaft mounted upon two vertical slotted bars, M, which are secured to the frame K by screws passing into said frame through the slots in the bars M, so that the latter may move up and down and be secured at any point desired, and thereby the reel be raised or lowered to meet the requirements of the stalks to be cut. Upon the outer extremity of each of the arms of the reel is a short curved wing, N, curved in such a manner that as the wing descends the concave side is toward the stalks and machine, and there will therefore be less liability that any of the said stalks will escape if once in contact with the reel. The wings N are also of such length that they will pass readily between the frames D D; but without allowing unnecessary space at the ends.

The rear bars of the frame D are slotted, as at O, for the purpose of allowing the adjustable platform P to pass across the machine just behind the cutters, and slightly below them, so that the butts of the cut stalks will be received thereon as they pass from the cutters. This platform is made adjustable, so as to accommodate the cutters at different heights. It is provided at each end with a stem, which projects through the slots of the frame D, and are secured by nuts on the outside of said frame. The platform P serves also, when securely fastened in any position, to brace and strengthen the front end of the machine.

The description thus far has pertained particularly to that part of the machine represented in Fig. 1; but it is to be understood that the parts described are in duplicate, as will appear by reference to Fig. 2, with the sole exception of the pulley by which the reel is driven.

I will now speak particularly of the peculiarities of the cutting apparatus. In cutting corn-stalks it is generally desired to cut them at a height of some three or four feet from the ground, as that portion of the stalk below that point contains no leaves and the stalk itself is worth little for fodder. It is also necessary to cut the stalks close to the ground, in order that the roots may be turned bottom upward by the plow, and their rotting and utilization thereby facilitated. This could not be done if a portion of the stalk of more than a few inches should be left attached to the root. I have therefore preferred to mount two pair of revolving cutters, which I prefer to have in the form of saws, upon the shafts F, the upper pair lapping past each other, but cutting as nearly in the same line as possible, and cutting the stalk at a distance of three or four feet from the ground, the lower pair running very near to the ground—say within four or five inches thereof—and cutting the stalk just above the root.

But it is not always desirable or feasible to cut the corn in one field at the same height that was proper in another. I have therefore made my cutters adjustable vertically, so that the upper cutters may be raised or lowered without affecting the lower cutters, or vice versa. This adjustment I prefer to accomplish in the manner represented, though any other of the well-known mechanical expedients for similar purposes may be substituted without in any way changing the principle of my machine's operation.

The method I have adopted is by cutting a screw-thread over the whole length of the shaft F, and placing thereon two pairs of nuts, with the cutter G H secured between them; and it is evident that the cutters may then be placed and set at any required height by running these nuts up or down the shaft, and that the said cutter may be secured at any point by setting the nuts hard toward each other.

Suspended from one side bar of the main frame A is an inclined platform, Q. Upon this platform the stalks, after being severed by the cutters, fall, and as they fall they slide or gather themselves at the lower edge of said platform, and are retained there by the gate R until a sufficient number has accumulated to form a bundle or shock, when the gate is bodily lifted upward, and the gavel is permitted to slide from the platform to the ground.

The gate R is formed of a cross-head with several long teeth, which project downward vertically from the side bar of the main frame A, which is opposite to the side bar from which the platform Q is suspended. The cross-head rests upon the upper side of the side bar, and the teeth descend to a point in such close contiguity to the lower edge of the platform that none of the stalks can escape therefrom until the gate is raised for that purpose. At each end of the cross-head is standard S S, for the purpose of guiding the gate as it rises and falls, and for convenience springs can be added to force the gate to descend after having been raised and released. The lever T, connected to the gate R by a rod or its equivalent, extends backward to a point convenient to the hand of the driver, being pivoted to the standard U, so that the gate may be operated by the driver at his pleasure.

The driver has his seat V upon the platform B, so that his weight at the rear end of the machine will counterbalance the weight of the cutters and their driving mechanism at the front end, and thereby reduce the weight upon the back of the horse. The seat V may be moved backward or forward to accomplish this purpose, according as the person of the driver is heavy or light.

The machine is propelled by one, two, or more horses, as may be found necessary, and for this purpose a pair of shafts are attached to one side of the machine, the outer portion, a, of the frame-work of which extends backward to the main axle of the bearing-wheel E, and is secured to the end of said axle outside of said wheel. This is for the purpose of strengthening this axle by giving it a support outside of the wheel which runs upon it, because, while the inner shaft draws directly from the frame of the machine, the outer shaft draws from the outer end of the axle, and said outer end is thereby relieved from any tendency to be bent or twisted backward by the action of the bearing-wheel. The horse or animal placed between the shafts supports the front end of the machine, and also guides it during its progress along the row; and if additional power is required, either to move the machine efficiently or to relieve any side draft that may be experienced, another horse is attached, either in front of the one between the shafts, or attached to the other side frame of the machine at W.

The reins by which the team is guided pass through rings or guides X, elevated high enough to be undisturbed by the operations of the machine.

The curved brace Y is secured to the outer side of each side bar, from whence it descends to the lower end of the frame D, and is connected thereto by the bolt C. The purpose of this bolt and brace is to strengthen the frame D.

The bolt C is composed of a section of tubing of the proper length to fill the space between the frame K and the brace Y, and a solid bolt with head at one end and screw-nut at the other is then passed through the two frames, and the tube and the nut being put in place, the whole is securely bound together. If found necessary this bolt may be extended across the space between the frames D D, to strengthen the front end of the main frame of the machine; but it is preferred that the platform P should perform this service, as the space between the platform and the cutter H will then be unobstructed.

Operation: The principal object is to procure a cutting apparatus which will be certain and effective in severing the stalks when they are brought in contact with it. The size and hardness of the stalk is such that shears, or cutters working upon the shear principle, must require great power to operate them with certainty, and they must be constantly liable to derangement or defective action, owing to the inequality of the stalks to be severed or their irregular positions. Revolving cutters appear to be the only ones which present features capable of meeting these difficulties. They may be run at very high speed with a comparatively small expense of power, and by simple momentum will cut through any such obstacles as will be brought against them. By using two saws or rotary cutters in connection, the stalk is severed smoothly and without splintering. The upper set of saws are larger than the lower set, so that the stalk is cut at the upper cut before it is cut below. The effect of this is that the stalk does not settle and rest upon the cutters before it is severed by these cutters. As the stalk is cut it is forced to slide from the cutters onto the platform P, and, being gently pushed by the reel, it thence falls backward between the side bars of the machine upon the platform Q, and as a sufficient quantity is gathered upon the platform the driver raises the gate R, and permits all that are then upon the platform to escape. When the gate is so raised and the gathered stalks escape, it will be observed they do not drop upon the stumps of the row that has been cut, but are cast into the furrow beside that row, and are thus removed from the path of the machine on its next round, because they are cast into the furrow which is toward that part of the field which has already been traversed by the machine.

When the stalk is cut by the lower cutters the root may then be turned over by the plow and covered without difficulty, which cannot be done if a considerable portion of the stalk is attached to the root, and the fertilizing portions of the refuse portion of the stalk are the better utilized.

It is requisite that the reel should be very delicately adjusted, so that while the stalk will be pushed backward it will not be pushed with so much power as to force the stalk over while it is yet unsevered. I therefore run the reel-driving belt so loose that it will slip when a slight resistance is offered to the revotion of the reel. This delicate adjustment I secure by using a twisted belt, which may be lengthened or tightened by twisting or untwisting, and this may be done at any time, as the ends are secured together by a simple hook.

Having described my invention, what I claim as new, and desire to secure by Letters Patent, is—

1. The revolving cutters herein described, arranged in respect to and operated independent of each other, as set forth, in combination with a machine for harvesting cane or corn stalks.

2. The screw-shafts F, in combination with the cutting apparatus of a corn or cane harvester, for the purpose of adjusting the height of the said cutting apparatus from the ground.

3. In combination with the revolving cutters G, the adjustable platform P, substantially as and for the purpose set forth.

4. The slotted bars M, in combination with the reel N and cutters G and H, arranged as described, of a cane or corn harvesting machine, for the purpose of adjusting the height of said reel.

5. In combination with the said bars A A, the platform B, provided with the vertical flange, as shown, for the purpose of stiffening said platform and frame.

6. Connecting the draft-frames $a$ of a corn and cane harvesting machine, as herein described, to the outer ends of the main axles, so that each of said axles shall be supported at a point outside of the bearing-wheel, substantially as and for the purpose specified.

7. In combination with the main frame and cutting apparatus of a harvester for cane and corn stalks, the curved brace-plate Y, to strengthen and support the lower end of the frame which contains the cutting apparatus.

8. In combination with the main frame A of a harvester for cane or corn stalks, as herein described, the vertical frame D, substantially as and for the purpose set forth.

DANIEL J. TITTLE.

Witnesses:
R. D. O. SMITH,
ANDREW WHITELEY.